US012589842B2

(12) United States Patent (10) Patent No.: US 12,589,842 B2
Austin (45) Date of Patent: Mar. 31, 2026

(54) FENDER HOOK ROPE ANCHOR

(71) Applicant: Daniel Austin, Pomona, CA (US)

(72) Inventor: Daniel Austin, Pomona, CA (US)

( * ) Notice: Subject to any disclaimer, the term of this patent is extended or adjusted under 35 U.S.C. 154(b) by 435 days.

(21) Appl. No.: 18/142,447

(22) Filed: May 2, 2023

(65) Prior Publication Data

US 2024/0367763 A1    Nov. 7, 2024

(51) Int. Cl.
　　*B63B 59/02*　　(2006.01)
　　*B63B 21/04*　　(2006.01)
　　*F16G 11/04*　　(2006.01)
(52) U.S. Cl.
　　CPC .............. *B63B 59/02* (2013.01); *B63B 21/04* (2013.01); *F16G 11/044* (2013.01)
(58) Field of Classification Search
　　CPC ........ B63B 59/02; B63B 21/04; F16G 11/044
　　See application file for complete search history.

(56) References Cited

U.S. PATENT DOCUMENTS 4,280,435　A　*　7/1981　Loomis ................. F16G 11/046
　　　　　　　　　　　　　　　　　114/221 R
7,143,708　B1 *　12/2006　Cimino ................... B63B 59/02
　　　　　　　　　　　　　　　　　24/115 R 8,001,659　B2 *　8/2011　Sorensen ................ E04H 15/64
　　　　　　　　　　　　　　　　　24/130
D680,851　S　*　4/2013　Lo .................................. D8/356
10,197,132　B2 *　2/2019　Pfahnl ................... F16G 11/046
11,339,852　B1 *　5/2022　Austin .................. F16G 11/106
2002/0162494　A1 *　11/2002　Skulnick ................ B63B 59/02
　　　　　　　　　　　　　　　　　114/219
2011/0132249　A1 *　6/2011　Loisel, Jr. .............. B63B 59/02
　　　　　　　　　　　　　　　　　114/219

* cited by examiner

*Primary Examiner* — S. Joseph Morano
*Assistant Examiner* — Jovon E Hayes
(74) *Attorney, Agent, or Firm* — Kirk A. Buhler; Buhler & Associates Patenting

(57) ABSTRACT

Improvements in a rope securing anchor for a boat fender that provides a versatile rope securing system to secure a boat to a dock or other location. The fender hook rope anchor can be quickly installed or removed from a boat fender and the rope can be quickly adjusted for the rope position within the fender hook rope anchor. The rope anchor has an open hook with a flexible tension finger that is easily installed and removed over the fender of a boat. A user can place the fender hook rope anchor where needed and quickly removed when not needed. There is an opening where a rope can pass and be secured using a one-way spring loaded and releasable cam. A user can quickly pass a rope through the opening to secure a line, and can pull the line out of the rope anchor when not needed.

20 Claims, 4 Drawing Sheets

FENDER HOOK ROPE ANCHOR

CROSS-REFERENCE TO RELATED APPLICATIONS

Not Applicable.

PRIOR ART

U.S. Pat. No. 4,280,435 issued on Jul. 28, 1981 to Donald W. Loomis and is titled One Piece Anchor for Adjustable Tethering a Rope Suspended Boat Fender. This patent discloses a novel one-piece anchor is described for adjustably tethering a rope suspended boat fender against the side of a boat so that the boat fender will be appropriately positioned with respect to the level of a dock against which the boat may be moored. In the preferred embodiment, the novel anchor comprises a substantially elongate member of uniform thickness, with a number of apertures, one end of which is differentiated into a hook, and the other end of which is rounded. While this patent discloses an adjustable rope tether, the tether does not have a one-way rope lock.

U.S. Pat. No. 7,143,708 issued on May 12, 2006 to William J, Cimino and is titled Boat Fender Mounting Device. This patent discloses boat fender mounting device having a planar member with a slot defined therein for receipt and retention of a rail/cable and at least one rope aperture for receipt and retention of the first end of a rope for supporting a boat fender at its second end at a desired height against the hull of a boat. This patent also does not disclose a one-way rope lock.

U.S. Published application No. 20110132249 was published on Sep. 6, 2011 to Robert W. Loisel Jr, and is titled Boat Fender Positioning Process. This publication discloses a method for adjustably positioning a boat fender on the side of a boat utilizes a flexible strap having a plurality of openings therein having a boat fender rope threaded therethrough. The boat fender rope can be quickly moved through the openings in the strap to raise or lower the boat fender to lock the boat fender in place on the side of the boat. This publication also does not disclose a one-way rope lock.

U.S. Published application No. 20020162494 was published on Jul. 11, 2002 to Steven Skulnick and is titled Recessed Line Holder for a Boat Fender. This publication discloses a boat fender with a recessed line holder to permit an individual to adjust the positioning of the boat fender to a desired length. The recessed line holder is flush with the outer surface of the boat fender to create a smooth outer surface. The recessed line holder has a bridge under which a rope is inserted through a passage. The rope may then be tied off or secured to another fender. While this publication does not disclose does not have a one-way rope lock.

What is needed is a fender hook rope anchor that can be quickly installed and removed on a fender and includes a one-way rope cam to hold the rope in position on the fender hook. The fender hook rope anchor disclosed in this document provides the solution.

BACKGROUND OF THE INVENTION

Boats require a variety of rope connections to hold a boat against a dock or in position in the water. Ropes are also used to on the deck and on fenders. Most solutions provide an apparatus where the rope is threaded, looped knotted or otherwise secured. While this secures the rope it limits the ability to tighten the rope and also the ability to quickly release the rope from the fender of the boat.

SUMMARY OF THE INVENTION

It is an object of the fender hook rope anchor to provide a versatile rope securing system to secure a boat to a dock or other location. The fender hook rope anchor can be quickly installed or removed from the fender of a boat and also allows for quick adjustment of the rope position within the fender hook rope anchor.

It is an object of the fender hook rope anchor to have an open hook that is quickly and easily installed and removed over the fender of a boat. This allows the user to place the fender hook rope anchor where needed for use and quickly removed when not needed.

It is another object of the fender hook rope anchor for the fender hook to include a flexible finger. The flexible finger provides some retention of the fender hook to prevent the fender hook from becoming dislodged from wave motion but can be manually lifted to pull the fender hook rope anchor off of the fender of the boat.

It is another object of the fender hook rope anchor to have an opening where a rope can pass and be secured. A user can quickly pass a rope through the opening to secure a line and can pull the line out of the rope anchor when not needed.

It is still another object of the fender hook rope anchor for the rope anchor to have a one-way locking mechanism. A user can pull the rope from one direction to tighten the rope and the rope will remain in position until released. The locking mechanism is a spring-loaded cam that prevents rope movement of the rope against the cam.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
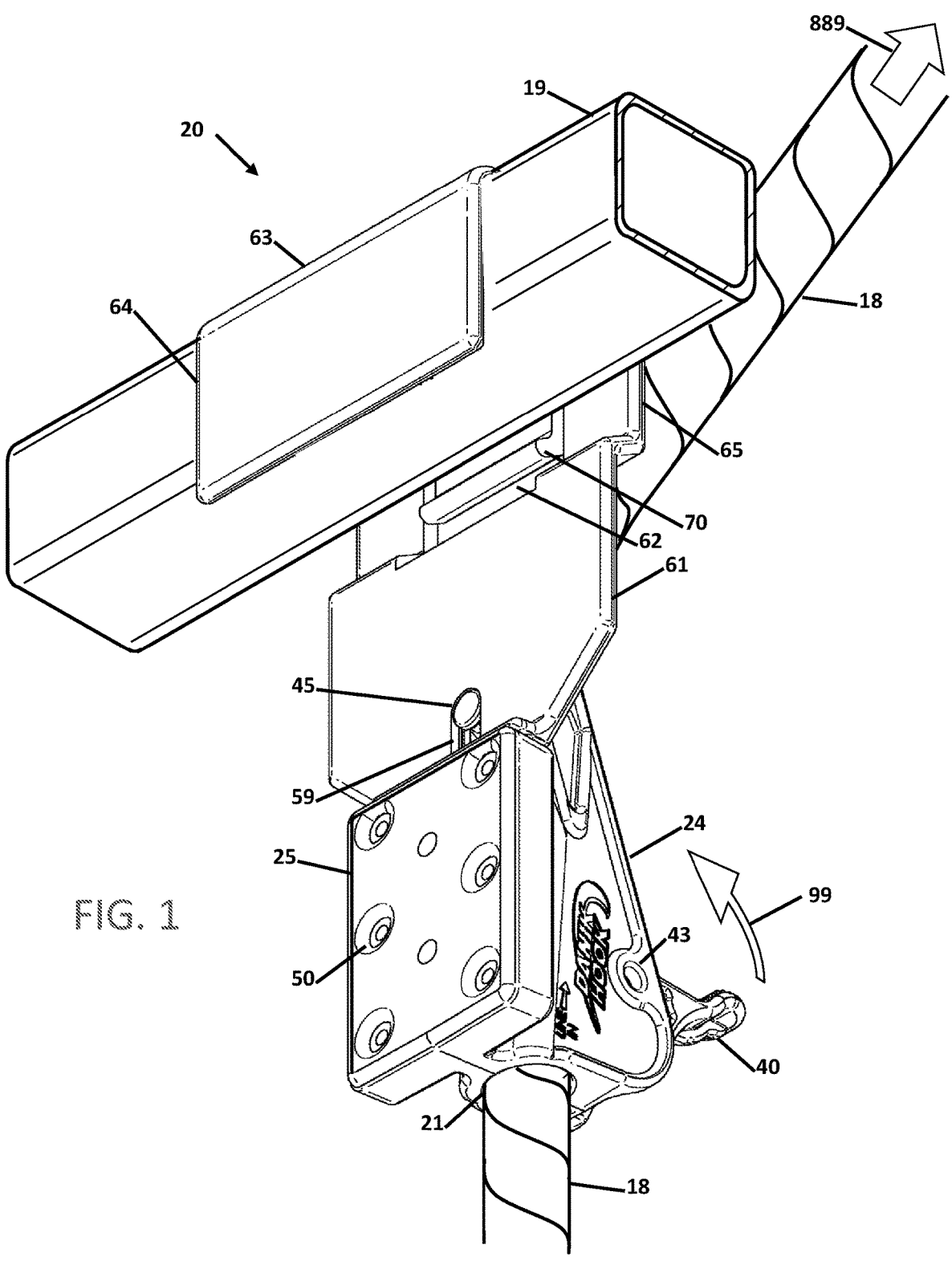
FIG. 1 shows a top perspective view of a fender hook rope anchor in an environment of use.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

ITEM NUMBERS AND DESCRIPTION

| | |
|---|---|
| 18 line | |
| 19 fender | 20 fender hook rope anchor |
| 21 line inlet | 22 line outlet |
| 23 bottom | 24 lower housing |
| 25 front plate | 26 nose |
| 40 locking tab | 41 lever |
| 42 teeth | 43 pivot |
| 44 spring hole | 45 tab |
| 46 saddle | 47 tooth |
| 48 undercut | 50 fastener(s) |
| 59 keyhole | 60 bend clearance opening(s) |
| 61 vertical member | 62 opening |
| 63 top | 64 front lip |
| 65 back | 65 opening |
| 66 tapered side(s) | 67 knee |
| 68 opening | 69 ledge |
| 70 locking finger | 71 ledge |
| 87 pulled | 88 pulled |
| 98 push | 99 rotate |

FIG. 1 shows a top perspective view of a fender hook rope anchor 20 in an environment of use with line 18 passing into a line or rope inlet 21 and through the lower housing 20. The lever of the locking tab 40 rotates 99 on the pivot 43 in the lower housing 24 to engage and disengage teeth (not shown in this figure) onto the line 18. Force of the lever creates a one-way grip on the line 18. When the line 18 is pulled 88 in one direction, the line 18 can slide under the teeth. When the line 18 is pulled in the opposite direction, the teeth will be pulled into the line 18 to prevent movement of the line 18.

The lower housing 24 is secured to an upper housing with a tab 45 that engages in a keyhole 59 and is further secured with fasteners 50 that pass though a front plate 25 into the bottom of the vertical member 61.

The upper portion of the fender hook rope anchor 20 has a vertical member 61 that transitions with a step to a back member 65. The back member 65 has a locking finger 70 in an opening 62 that is configured to engage at least partially around a fender 19. The back member 65 is connected to a top 63 and a front lip 64 that is configured to extend at least partially around the fender 19 or tube.

Figure 2:
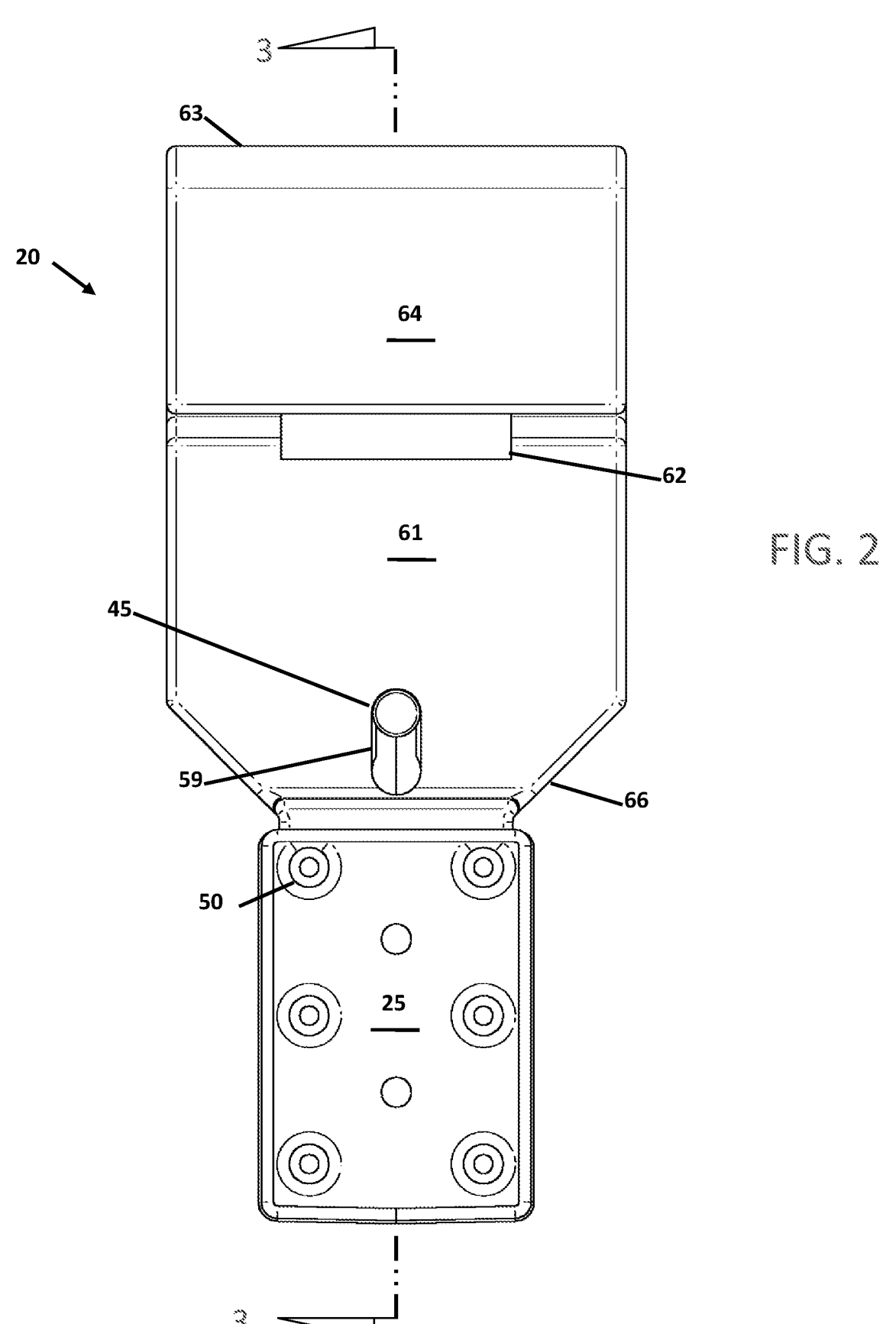
FIG. 2 shows a front view of the fender hook rope anchor.
Figures 3, 4:
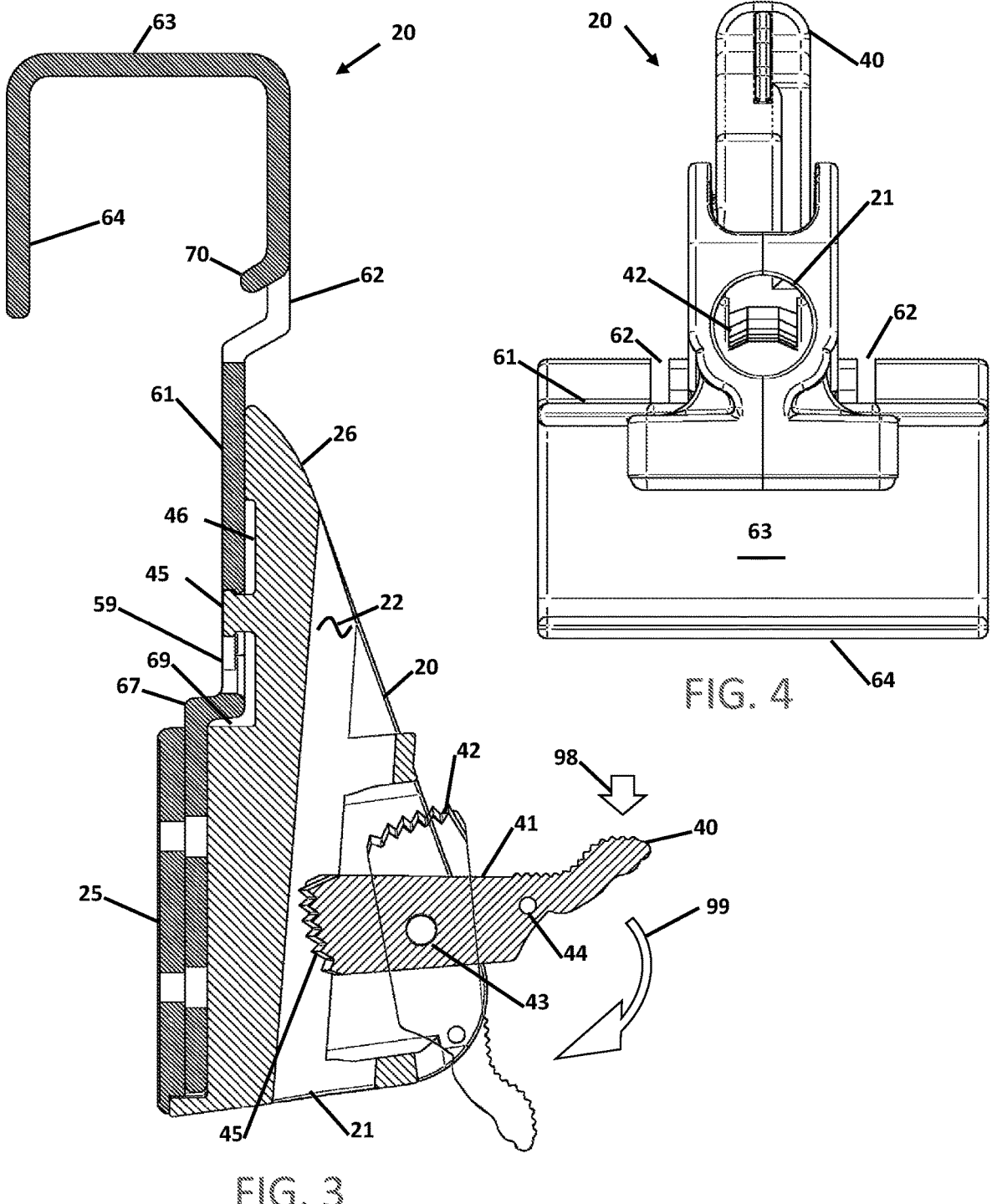
FIG. 3 is a cross-sectional view taken from 3-3 in FIG. 2.
FIG. 4 is a top view of the fender hook rope anchor.

FIG. 2 shows a front view of the fender hook rope anchor 20 and FIG. 3 is a cross-sectional view taken from 3-3 in FIG. 2. Starting with the locking tab 40 on a lever 41 that pivots on the pivot 43. A spring (not shown) connects into spring hole 44 to bias the lever 41 to rotate 99 the locking tab 40 onto a line or rope (shown in FIG. 1) so the teeth 42 of the locking tab 40 will brake movement of the line or rope that passes from the line inlet 21 through the line outlet 22 near a rounded front nose 26. When a user will push 98 down on the locking tab 40, the locking tab 40 will be lifted from the rope or line thereby allowing the rope or line to be fed into the housing or moved freely through the housing. The housing has a stop to limit rotation of the locking tab 40. At the side of the housing opposing the locking tab 40 is a fender hook component that is secured, clamped or sandwiched into one side of the line locking housing.

The fender hook component joins to the line securing components with the vertical member 61 connecting on a tab 45 in a keyhole 59 that passes through a vertical member 61. A clearance saddle 46 exists under the vertical member 61 with tapered sides 66. The front plate 25 also connects to the rope line anchor with fastener(s) 50, but could also be glued, heat staked or joined with other means. Above the front plate 25 is a knee 67 bend that sits on a ledge 69 that limits movement of the fender hook portion on the line anchor portion. Above the vertical member 61 is an opening where a locking finger 70 passes therethrough. The locking finger 70 flexes from the top 63 portion of the fender hook in the opening 62 to retain the fender hook on a fender or tube as previously shown. The front lip 64 is configured to wrap over at least a portion of the fender or tube as previously shown.

FIG. 4 is a top view of the fender hook rope anchor 20. This view looks through the line inlet 21 where the teeth 42 of the locking tab 40 are visible at the top portion of the view. The lever 41 is shown as a rotated cross-section and as a line drawing where the rope or line can freely pass through without interacting with the teeth 42. These teeth 42 grip into a rope or line (not shown) to allow the rope to pass through the fender hook rope anchor 20 when pulled on one direction and prevents free movement of the rope or line when it is pulled in the opposite direction. At the lower portion of the view the fender connection portion is shown with the opening(s) 62 on both sides of the fender hook rope anchor 20. The vertical member 61 is shown extending into the view with the underside of the top 63 of the fender hook portion. The front lip 64 is shown extending up from the top 63.

Figures 5, 6:
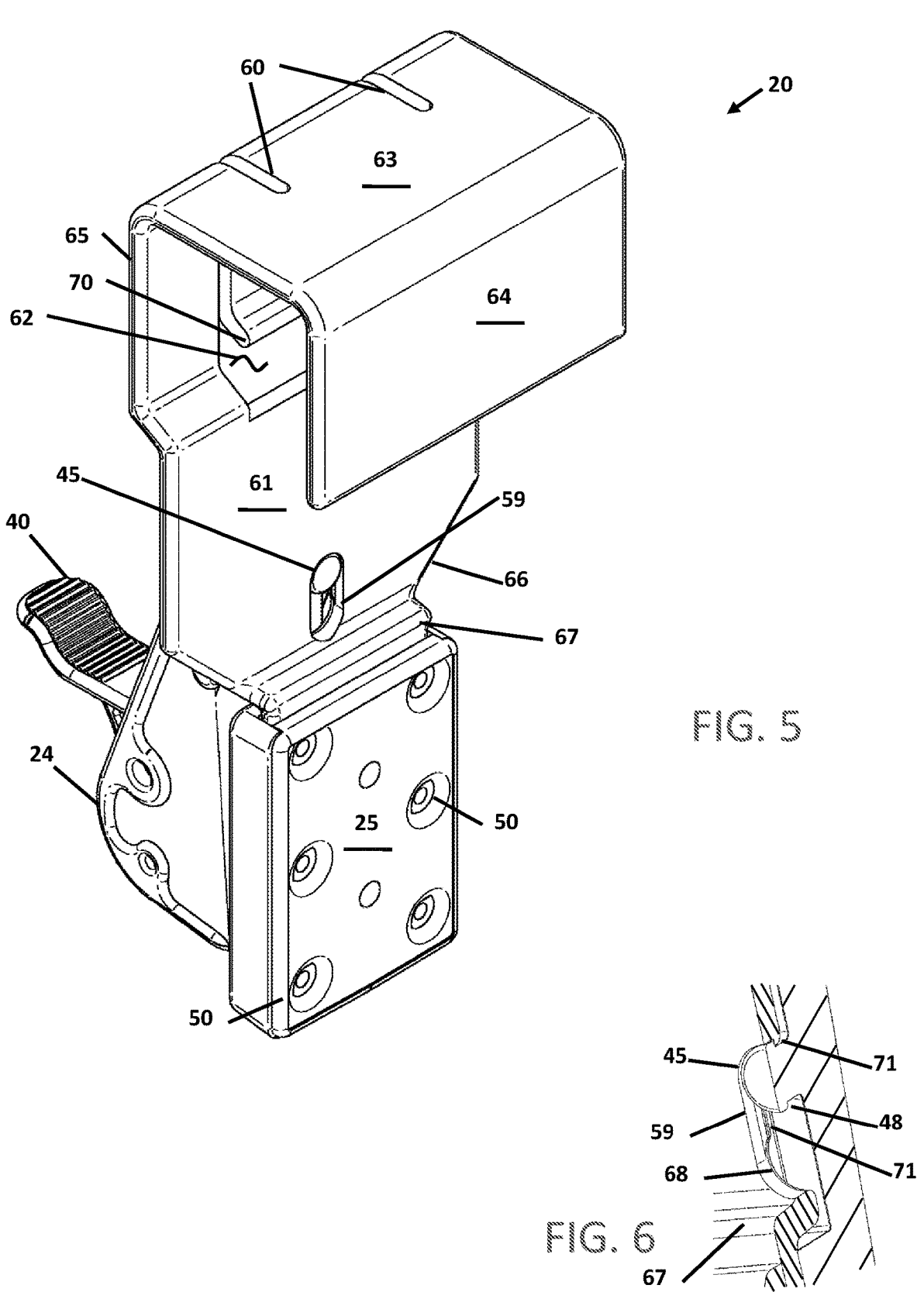
FIG. 5 is a bottom perspective view of the fender hook rope anchor.
FIG. 6 is a perspective cross-section of the key engaged in the keyway.

FIG. 5 is a bottom perspective view of the fender hook rope anchor 20 and FIG. 6 is a perspective cross-section of the key engaged in the keyway keyhole 59. The lever of the locking tab 40 rotates in the lower housing 24 to engage and disengage teeth (not shown in this figure) onto a rope or line 18 (not shown). The lower housing 24 is secured to an upper housing with a tab 45 that engages in a keyhole 59 and is further secured with fasteners 50 that passes through a front plate 25 into the bottom of the vertical member 61 with tapered sides 66 after a knee 67 bend.

The upper portion of the fender hook rope anchor 20 has a vertical member 61 that transitions with a step to a back member 62. The back member 62 has a locking finger 70 that is configured to engage at least partially around a fender 19. The back member 62 is connected to a top 63 and a front lip 64 that is configured to extend at least partially around a fender or tube (not shown). The locking finger with the bend clearance openings 60 are visible in this figure where the bend clearance openings terminate in the top 63 of the fender hook portion. This allows the majority of the bending and flexing to occur along the length of the locking finger 70 and into the top 63 of the housing so the fender is at least partially retained between the front lip 64, top 63 and the back 65.

From FIG. 6 the keyhole 59 opening shows where the circular body of the tab 45 can pass through the opening 68 and slide along the ledge 71 to secure the underside of the tab 45 undercut 48 in the ledge 71.

Thus, specific embodiments of a fender hook rope anchor have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A fender hook rope anchor comprising:

a housing;

said housing having an opening that is configured for a line to pass through said opening;

said opening includes a one-way line brake that allows movement of a line through said brake in a first direction of travel and stops movement of said line in an opposite direction of travel;

said housing having a temporal securing mechanism for a fender or a tube;

said securing mechanism for said fender or said tube having a vertical member, a top and a front lip therein between, and said securing mechanism further includes a flexible finger that is configured to provide retention of said fender hook rope anchor on said fender or said tube.

2. The fender hook rope anchor according to claim 1, further includes a key shaped hole for securing a fender hook portion to a rope anchor portion.

3. The fender hook rope anchor according to claim 2, wherein said key shape has an opening in said fender hook portion that is configured for a head in said rope anchor portion to pass into said key shape hole.

4. The fender hook rope anchor according to claim 3, wherein said key shape hole further includes a slotted area that is narrower than said head.

5. The fender hook rope anchor according to claim 1, wherein said line brake has a lever that is rotated by a spring that biases said lever into a line passage.

6. The fender hook rope anchor according to claim 5, wherein said line brake allows a line to be pulled on only one direction through said line passage.

7. The fender hook rope anchor according to claim 1, wherein said line brake has a manually operable lever.

8. The fender hook rope anchor according to claim 1, wherein manually operable lever allows for free passage of said line or one-way passage of said line through said opening.

9. The fender hook rope anchor according to claim 1, wherein said operable lever has a plurality of teeth that are configured to engage in said line.

10. The fender hook rope anchor according to claim 1, further includes a securing fastener that secures said rope anchor to said fender hook.

11. The fender hook rope anchor according to claim 1, wherein said flexible finger hinges from said top of said fender hook.

12. The fender hook rope anchor according to claim 11, wherein said finger flexes between openings at the sides of said finger in said vertical member.

13. The fender hook rope anchor according to claim 1, wherein said finger extends to said front lip into an area between said vertical member.

14. The fender hook rope anchor according to claim 13, wherein said finger exists above the bottom of a knee.

15. The fender hook rope anchor according to claim 13, wherein said finger is configured to retain a fender between said finger and an underside of a wall of said top of said fender hook.

16. The fender hook rope anchor according to claim 1, wherein said fender hook has a knee portion that rests on a ledge.

17. The fender hook rope anchor according to claim 1, wherein said vertical member has tapered sides from said fender hook to said rope anchor.

18. The fender hook rope anchor according to claim 1, wherein an opening between said front lip and said vertical member is narrower than an opening between said front lip and said back.

19. The fender hook rope anchor according to claim 18, wherein front lip bends under said top of said fender hook.

20. The fender hook rope anchor according to claim 1, further includes a fender on a boat or ship.

* * * * *